(12) United States Patent
Yamada et al.

(10) Patent No.: US 12,222,018 B2
(45) Date of Patent: Feb. 11, 2025

(54) SHOCK ABSORBER

(71) Applicant: Hitachi Astemo, Ltd., Ibaraki (JP)

(72) Inventors: Kazuya Yamada, Hitachinaka (JP);
Kentaro Yamada, Hitachinaka (JP);
Reiji Nakagawa, Hitachinaka (JP);
Hiroyasu Sato, Hitachinaka (JP);
Sadatomo Matsumura, Hitachinaka (JP); Wataru Takagi, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 353 days.

(21) Appl. No.: 17/640,857

(22) PCT Filed: Sep. 25, 2020

(86) PCT No.: PCT/JP2020/036315
§ 371 (c)(1),
(2) Date: Mar. 7, 2022

(87) PCT Pub. No.: WO2021/065729
PCT Pub. Date: Apr. 8, 2021

(65) Prior Publication Data
US 2022/0275847 A1 Sep. 1, 2022

(30) Foreign Application Priority Data
Oct. 2, 2019 (JP) .................. 2019-182405

(51) Int. Cl.
*F16F 9/32* (2006.01)
*B60G 13/08* (2006.01)
*F16F 9/18* (2006.01)

(52) U.S. Cl.
CPC ............ *F16F 9/3214* (2013.01); *F16F 9/185* (2013.01); *B60G 13/08* (2013.01);
(Continued)

(58) Field of Classification Search
CPC ........ F16F 9/3214; F16F 9/185; F16F 222/12; F16F 2230/30; F16F 2232/08;
(Continued)

(56) References Cited

U.S. PATENT DOCUMENTS 1,802,281 A * 4/1931 Shimer ................ F04B 53/143
   92/249
2,772,931 A * 12/1956 Biedermann ............ F16J 1/008
   277/437

(Continued)

FOREIGN PATENT DOCUMENTS

| JP | 2002-276808 A | 9/2002 |
| JP | 2018-138789 A | 9/2018 |
| WO | 2019/225544 A1 | 11/2019 |

OTHER PUBLICATIONS

International Search Report received in corresponding International Application No. PCT/JP2020/036315 dated Nov. 24, 2020.
(Continued)

*Primary Examiner* — Bradley T King
*Assistant Examiner* — James K Hsiao
(74) *Attorney, Agent, or Firm* — MATTINGLY & MALUR, PC

(57) ABSTRACT

This shock absorber includes a piston main body and a piston band. The piston main body has, at an outer peripheral portion thereof, a stepped portion including a large-diameter surface portion, a stepped surface portion and a small-diameter surface portion. The piston band has, at an outer peripheral portion thereof, a large diameter portion, a medium diameter portion formed so as to have a smaller diameter than the large diameter portion, and a small diameter portion formed between the large diameter portion and the medium diameter portion so as to have a smaller diameter than the medium diameter portion, in a state before being disposed in a cylinder. At one end on the side close to
(Continued)

a tip portion of a piston rod, an inner peripheral surface is inclined toward the piston main body side from the large-diameter surface portion to a small-diameter surface portion of the stepped portion.

11 Claims, 8 Drawing Sheets

(52) U.S. Cl.
CPC ...... *B60G 2202/24* (2013.01); *B60G 2206/41* (2013.01); *B60G 2800/162* (2013.01); *F16F 2222/12* (2013.01); *F16F 2230/30* (2013.01); *F16F 2232/08* (2013.01); *F16F 2234/02* (2013.01)

(58) Field of Classification Search
CPC  F16F 2234/02; F16F 9/368; F16F 9/32; F16J 9/28; F16J 15/18; B60G 13/08; B60G 2202/24; B60G 2800/162
See application file for complete search history.

(56) References Cited

U.S. PATENT DOCUMENTS

| | | | | |
|---|---|---|---|---|
| 2,984,529 A * | 5/1961 | Dailey | ............... | F04B 53/143 277/567 |
| 2,994,571 A * | 8/1961 | Peras | ............... | F16J 15/3284 277/491 |
| 3,136,228 A * | 6/1964 | Dailey | ............... | F16J 1/008 92/85 R |
| 3,212,411 A * | 10/1965 | Storms | ............... | F16J 1/006 92/155 |
| 3,563,557 A * | 2/1971 | Doutt | ............... | F16J 15/3236 277/565 |
| 3,605,553 A * | 9/1971 | Panigati | ............... | F15B 15/223 91/394 |
| 3,730,305 A * | 5/1973 | Fouts | ............... | F16F 9/3214 188/322.18 |
| 4,075,935 A * | 2/1978 | Panigati | ............... | F16J 15/3232 92/249 |
| 4,371,177 A * | 2/1983 | Bahr | ............... | F16J 15/3236 277/944 |
| 4,376,472 A * | 3/1983 | Heyer | ............... | F16J 1/02 188/282.8 |
| 4,747,606 A * | 5/1988 | Jennings | ............... | F16J 15/0887 285/108 |
| 5,435,233 A * | 7/1995 | Bowell, Sr. | ............... | F16J 1/006 277/924 |
| 5,785,160 A * | 7/1998 | Grundei | ............... | F16F 9/3214 188/322.22 |
| 6,305,266 B1 * | 10/2001 | Jensen | ............... | B23P 15/10 92/248 |
| 6,591,948 B2 * | 7/2003 | Casellas | ............... | F16F 9/3214 188/322.18 |
| 8,104,174 B2 * | 1/2012 | Gruber | ............... | B23P 15/10 29/457 |
| 9,772,000 B2 * | 9/2017 | Fukushima | ............... | F16F 9/3214 |
| 10,138,975 B2 * | 11/2018 | Senou | ............... | F16F 9/3482 |
| 2002/0046651 A1 * | 4/2002 | Casellas | ............... | F16F 9/368 92/248 |
| 2002/0056368 A1 * | 5/2002 | May | ............... | F04B 53/143 188/322.18 |
| 2002/0117366 A1 * | 8/2002 | Casellas | ............... | F16F 9/3214 188/322.15 |
| 2010/0193309 A1 * | 8/2010 | Gruber | ............... | B23P 15/10 188/322.18 |
| 2021/0222751 A1 * | 7/2021 | Hayakawa | ............... | F16J 15/3276 |

OTHER PUBLICATIONS

Written Opinion received in corresponding International Application No. PCT/JP2020/036315 dated Nov. 24, 2020.

* cited by examiner

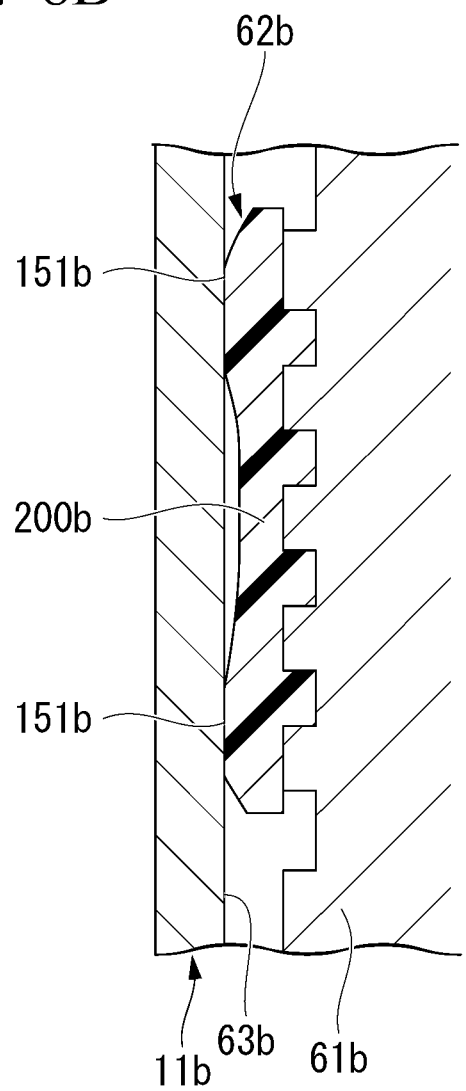

SHOCK ABSORBER

TECHNICAL FIELD

The present invention relates to a shock absorber.

Priority is claimed on Japanese Patent Application No. 2019-182405, filed Oct. 2, 2019, the content of which is incorporated herein by reference.

BACKGROUND ART

As a piston portion that is used for a shock absorber or the like, a configuration in which a piston main body is covered with a piston ring having an annular protrusion portion is known (refer to, for example, Patent Document 1).

CITATION LIST

Patent Document

[Patent Document 1]
Japanese Unexamined Patent Application, First Publication No. 2002-276808

SUMMARY OF INVENTION

Technical Problem

In a shock absorber, the frictional force between a piston and a cylinder changes according to the radial force that is applied to a piston rod. There is a demand to increase the ratio of an increase in frictional force to an increase in the radial force.

The present invention provides a shock absorber in which it is possible to increase the ratio of an increase in the frictional force between a piston and a cylinder to an increase in the radial force that is applied to a piston rod.

Solution to Problem

According to a first aspect of the present invention, a shock absorber includes a piston main body and a piston band. The piston main body includes a stepped portion that includes a large-diameter surface portion, a stepped surface portion, and a small-diameter surface portion, at one end on the side close to the tip portion of a piston rod, of the outer peripheral portion on which the piston hand is mounted. The piston band includes, at an outer peripheral portion thereof, a large diameter portion that is formed on the side close to the tip portion of the piston rod, a medium diameter portion that is formed on the side far from the tip portion so as to have a smaller diameter than the large diameter portion, and a small diameter portion that is formed between the large diameter portion and the medium diameter portion so as to have a smaller diameter than the medium diameter portion, in a state before being disposed in a cylinder. At the one end on the side close to the tip portion of the piston rod, an inner peripheral surface is inclined toward the piston main body side from the large-diameter surface portion to the small-diameter surface portion of the stepped portion.

According to a second aspect of the present invention, a shock absorber includes a piston main body and a piston hand. The piston main body includes a stepped portion that includes a large-diameter surface portion, a stepped surface portion, and a small-diameter surface portion, at one end on the side close to a tip portion of a piston rod in an outer peripheral portion on which the piston band is mounted. The piston band includes, at an outer peripheral portion thereof, a small diameter portion, a first projecting portion that is provided to protrude from the small diameter portion on the side close to the tip portion of the piston rod with respect to the small diameter portion, and a second projecting portion that is provided to protrude from the small diameter portion on the side far from the tip portion with respect to the small diameter portion and is smaller than the first projecting portion, in a state before being disposed in the cylinder. At one end of the piston band on the side close to the tip portion of the piston rod, an inner peripheral surface is inclined from the large-diameter surface portion toward the small-diameter surface portion.

Advantageous Effects of Invention

According to the shock absorber described above, it is possible to increase the ratio of an increase in the frictional force between the piston and the cylinder to an increase in the radial force that is applied to the piston rod.

BRIEF DESCRIPTION OF DRAWINGS

FIG. 8B is a sectional view in a state where a piston of a shock absorber is disposed in a cylinder, showing Comparative Example 2.

DESCRIPTION OF EMBODIMENTS

A shock absorber according to an embodiment of the present invention will be described below with reference to the drawings.

Figure 1:
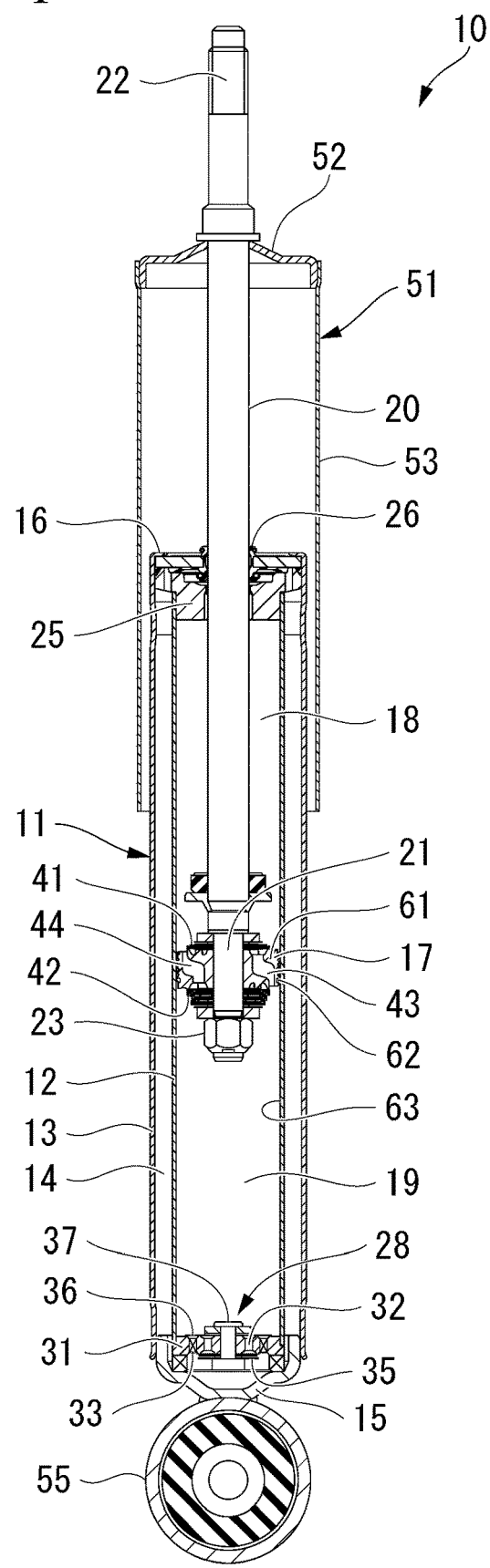
FIG. 1 is a sectional view showing a shock absorber according to an embodiment of the present invention.

A shock absorber 10 of the present embodiment is a shock absorber that is used in a suspension device of an automobile or a railroad vehicle. As shown in FIG. 1, the shock absorber 10 includes a cylinder 11 in which a working fluid is enclosed. The cylinder 11 includes an inner cylinder 12 having a cylindrical shape and a bottomed cylinder-shaped outer cylinder 13 having a larger diameter than the inner cylinder 12 and provided outside the inner cylinder 12. A reservoir chamber 14 is formed between the inner cylinder 12 and the outer cylinder 13. The outer cylinder 13 has a bottom portion 15 on one side in an axial direction and an opening portion 16 on the other side in the axial direction. The opening portion 16 is an opening portion of the cylinder 11.

A piston 17 is slidably inserted into the inner cylinder 12 of the cylinder 11. The piston 17 defines the inside of the inner cylinder 12 of the cylinder 11 into a one-side chamber 18 and the other-side chamber 19. In the cylinder 11, a hydraulic fluid as a working fluid is enclosed in the one-side chamber 18 and the other-side chamber 19, and a hydraulic fluid as a working fluid and a gas are enclosed in the reservoir chamber 14. The cylinder 11 configured of the bottomed cylinder-shaped outer cylinder 13 and the inner cylinder 12 disposed inside the outer cylinder 13 has a bottomed cylinder shape, and the working fluid is enclosed inside the cylinder 11.

A piston rod 20 made of metal is connected to the piston 17. In the piston rod 20, a base end portion 21 on one side in the axial direction is inserted into the cylinder 11, and a tip portion 22 on the other side in the axial direction protrudes outward from one end in the axial direction of the cylinder 11, that is, one end in the axial direction of each of the inner cylinder 12 and the outer cylinder 13. The piston 17 is fixed to the base end portion 21 of the piston rod 20 by a nut 23. The piston 17 moves integrally with the piston rod 20.

An annular rod guide 25 and an annular seal member 26 are disposed inside the cylinder 11, and a base valve 28 is provided inside the cylinder 11. The annular rod guide 25 and the annular seal member 26 are disposed on the opening portion 16 side of the outer cylinder 13, from which the piston rod 20 protrudes. The base valve 28 is provided on the bottom portion 15 side of the outer cylinder 13. In the inner cylinder 12, the space between the piston 17 and the rod guide 25 is the one-side chamber 18, and the space between the piston 17 and the base valve 28 is the other-side chamber 19. Therefore, in the piston 17, the one-side chamber 18 in the axial direction is on the side close to the tip portion 22 of the piston rod 20, and the other-side chamber 19 in the axial direction is on the side far from the tip portion 22 of the piston rod 20.

The rod guide 25 is provided on the side opposite to the bottom portion 15 of the cylinder 11. The rod guide 25 positions an end portion on the opening portion 16 side in the axial direction of the inner cylinder 12 with respect to the outer cylinder 13, and guides the axial movement of the piston rod 20 while restricting the radial movement of the piston rod 20. The seal member 26 closes the opening portion 16 side of one end of the cylinder 11 and restrains the hydraulic fluid in the inner cylinder 12 and the gas and the hydraulic fluid in the reservoir chamber 14 from leaking to the outside.

The base valve 28 has a base body 31. The base body 31 partitions the other-side chamber 19 and the reservoir chamber 14, and positions an end portion on the bottom portion 15 side in the axial direction of the inner cylinder 12 with respect to the outer cylinder 13. A liquid passage 32 and a liquid passage 33 capable of making the other-side chamber 19 and the reservoir chamber 14 communicate with each other are formed in the base body 31. A disc valve 35 and a disc valve 36 are mounted to the base body 31 with a rivet 37. The disc valve 35 is capable of opening and closing the liquid passage 32 on the inner side in the radial direction. The disc valve 36 is capable of opening and closing the liquid passage 33 on the outer side in the radial direction.

The disc valve 35 allows the flow of the hydraulic fluid from the other-side chamber 19 to the reservoir chamber 14 while restricting the flow of the hydraulic fluid from the reservoir chamber 14 to the other-side chamber 19 through the liquid passage 32. The disc valve 35 is a damping valve that causes the hydraulic fluid to flow from the other-side chamber 19 to the reservoir chamber 14 when the piston rod 20 moves to the contraction side in which the amount of extension hereof from the cylinder 11 reduces, and generates a damping force at that time.

The disc valve 36 allows the flow of the hydraulic fluid from the reservoir chamber 14 to the other-side chamber 19 while restricting the flow of the hydraulic fluid from the other-side chamber 19 to the reservoir chamber 14 through the liquid passage 33. The disc valve 36 is a suction valve that allows the hydraulic fluid to flow from the reservoir chamber 14 to the other-side chamber 19 without substantially generating a damping force, when the piston rod 20 moves to the extension side in which the amount of extension thereof from the cylinder 11 increases.

The piston 17 described above and disc valves 41 and 42 on both sides thereof are mounted to the piston rod 20 by a nut 23 at the base end portion 21 on the side where the piston rod 20 is inserted into the inner cylinder 12. A liquid passage 43 and a liquid passage 44 capable of making the other-side chamber 19 and the one-side chamber 18 communicate with each other are formed in the piston 17. The disc valve 41 is capable of opening and closing the liquid passage 43. The disc valve 42 is capable of opening and closing the liquid passage 44.

The disc valve 41 allows the flow of the hydraulic fluid from the other-side chamber 19 to the one-side chamber 18 while restricting the flow of the hydraulic fluid from the one-side chamber 18 to the other-side chamber 19 through the liquid passage 43. The disc valve 41 is a damping valve that causes the hydraulic fluid to flow from the other-side chamber 19 to the one-side chamber 18 when the piston rod 20 moves to the contraction side, and generates a damping force at that time.

The disc valve 42 allows the flow of the hydraulic fluid from the one-side chamber 18 to the other-side chamber 19 while restricting the flow of the hydraulic fluid from the other-side chamber 19 to the one-side chamber 18 through the liquid passage 44. The disc valve 42 is a damping valve that causes the hydraulic fluid to flow from the one-side chamber 18 to the other-side chamber 19 when the piston rod 20 moves to the extension side, and generates a damping force at that time.

A cover member 51 is mounted on one side of the piston rod 20 extending from the cylinder 11. The cover member 51 has a circular plate-shaped annular member 52 and a cylinder-shaped tubular member 53. The annular member 52 is fixed to a midway portion in the axial direction on one side of the piston rod 20 extending from the cylinder 11. The tubular member 53 is joined to the outer periphery side of the annular member 52 and extends in the direction of the cylinder 11 from the annular member 52. The tubular member 53 overlaps the cylinder 11 in the axial direction. The tubular member 53 covers the outer peripheral portion of the cylinder 11 and the portion of the piston rod 20 protruding from the seal member 26.

A mounting eye 55 is fixed to the outer side of the bottom portion 15 of the outer cylinder 13.

When the shock absorber 10 is mounted to a vehicle, for example, the tip portion 22 of the piston rod 20 is disposed on the upper side and connected to the vehicle body side, and the mounting eye 55 is disposed on the lower side and connected to the wheel side.

The shock absorber 10 generates a damping force on the extension side as follows. That is, when the piston rod 20 moves to the extension side, the piston 17 moves integrally with the piston rod 20 in the direction of reducing the volume of the one-side chamber 18 and increasing the volume of the other-side chamber 19. Then, the disc valve 42 provided in the piston 17 causes the hydraulic fluid to flow from the one-side chamber 18 to the other-side chamber 19 through the liquid passage 44, and generates a damping force at that time. At this time, the disc valve 36 of the base valve 28 causes the hydraulic fluid to flow from the reservoir chamber 14 to the other-side chamber 19 without substantially generating a damping force, thereby supplementing the other-side chamber 19 with the hydraulic fluid by an amount corresponding to the volume of the piston rod 20 protruding from the cylinder 11.

The shock absorber 10 generates a damping force on the contraction side as follows. That is, when the piston rod 20 moves to the contraction side, the piston 17 moves integrally with the piston rod 20 in the direction of reducing the volume of the other-side chamber 19 and increasing the volume of the one-side chamber 18. Then, the disc valve 41 provided in the piston 17 causes the hydraulic fluid to flow from the other-side chamber 19 to the one-side chamber 18 through the liquid passage 43, and generates a damping force at that time. Further, at this time, the disc valve 35 of the base valve 28 causes the hydraulic fluid to flow from the other-side chamber 19 to the reservoir chamber 14, and generates a damping force at that time.

The piston 17 is configured of a piston main body 61 made of metal and a piston hand 62 made of synthetic resin. The piston main body 61 is fixed to the base end portion 21 of the piston rod 20. The piston band 62 is mounted on an outer peripheral portion 60 of the piston main body 61 to configure an outer peripheral portion of the piston 17. The piston band 62 is in sliding contact with an inner peripheral portion 63 of the inner cylinder 12 of the cylinder 11 to seal the gap between the piston 17 and the inner peripheral portion 63.

The piston main body 61 has an annular shape. The base end portion 21 of the piston rod 20 is fitted to the inner periphery side of the piston main body 61. The liquid passages 43 and 44 are formed in the piston main body 61.

The configuration on the outer periphery side of the piston 17 will be further described.

Figure 2:
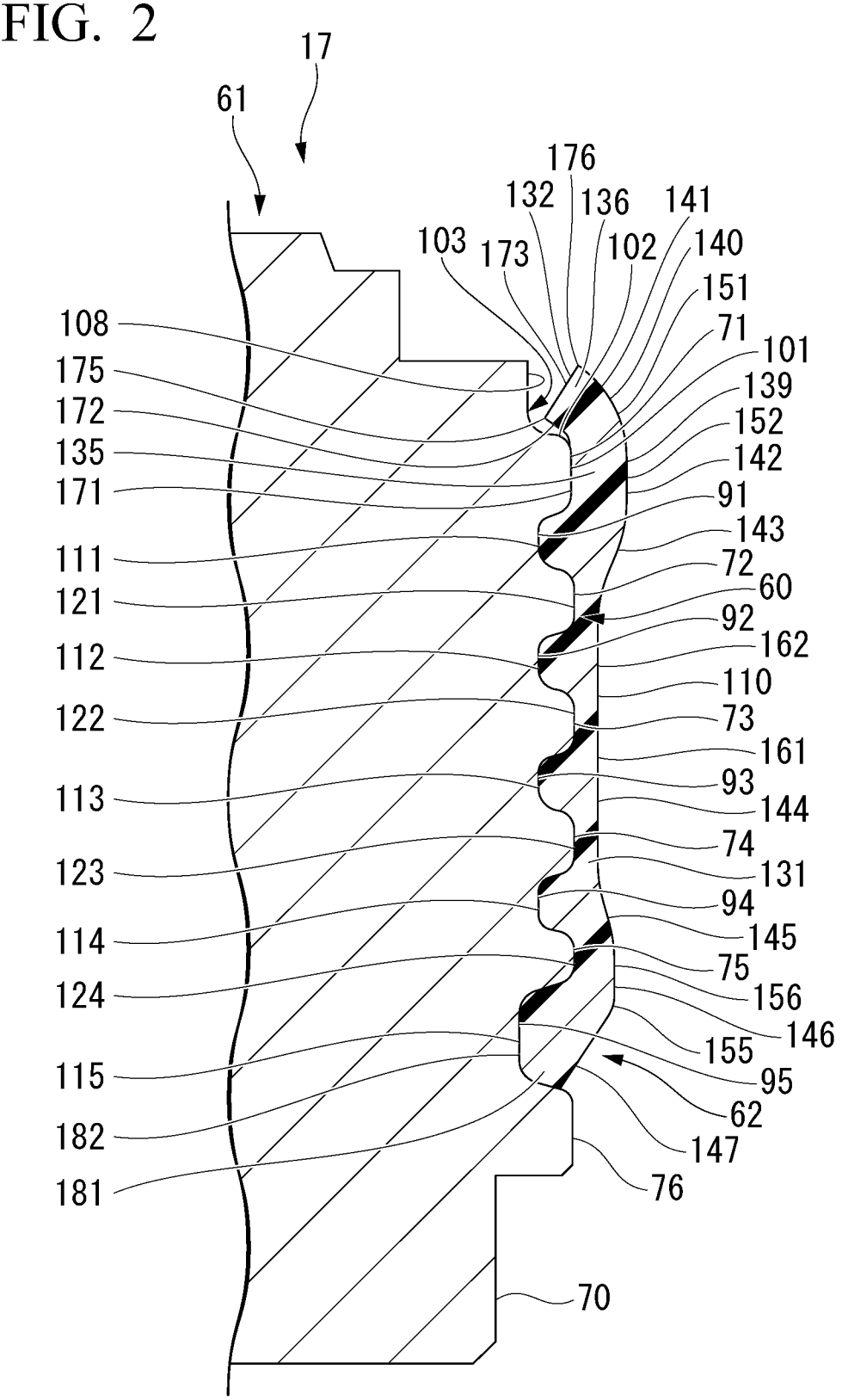
FIG. 2 is a sectional view showing an outer peripheral portion of a piston before being disposed in a cylinder in the shock absorber according to the embodiment of the present invention.

As shown in FIG. 2, the outer peripheral portion 60 of the piston main body 61 has an outer peripheral main body portion 70 having a substantially cylindrical shape, and a plurality of (specifically, six) protrusion portions: a protrusion portion 71 (a first protrusion portion), a protrusion portion 72, a protrusion portion 73, a protrusion portion 74, a protrusion portion 75, and a protrusion portion 76 (a second protrusion portion), arranged in order from the tip portion 22 side (the upper side in FIG. 2) at intervals in the axial direction of the piston main body 61. Each of the protrusion portions 71 to 76 has an annular shape. Each of the protrusion portions 71 to 76 protrudes outward in the radial direction from the outer peripheral main body portion 70.

The outer diameter of the protrusion portion 71 that is on the side closest to the tip portion 22 in the axial direction of the piston main body 61 (the upper side in FIG. 2), among the protrusion portions 71 to 76, is smaller than the outer diameters of all the other protrusion portions 72 to 76. The outer diameters of the protrusion portions 72 to 76 are the same. The outer diameter surface of the protrusion portion 71, which is an outer diameter measurement position, has a cylindrical surface shape. Similarly, the outer diameter surface of each of the protrusion portions 72 to 76 also has a cylindrical surface shape.

The axial dimension of the protrusion portion 71, which is a length in the axial direction oaf the piston main body 61, is larger than the axial dimensions of the other protrusion portions 72 to 75. The length of the outer diameter surface of the protrusion portion 71 in the axial direction of the piston main body 61 is also longer than the length of the outer diameter surface of each of the other protrusion portions 72 to 75 in the axial direction of the piston main body 61. The axial dimensions of the protrusion portions 72 to 74 are the same, and the axial dimension of the protrusion portion 75 is smaller than the axial dimensions of the protrusion portions 72 to 74. The length of the outer diameter surface of each of the protrusion portions 72 to 74 in the axial direction of the piston main body 61 is also longer than the length of the outer diameter surface of the protrusion portion 75 in the axial direction of the piston main body 61.

A recess portion 91 is formed between the protrusion portions 71 and 72 adjacent to each other in the axial direction, among the protrusion portions 71 to 76. The recess portion 91 is annularly recessed inward in the radial direction with respect to the outer diameter surfaces of the protrusion portions 71 and 72. Similarly, a recess portion 92 is formed between the protrusion portions 72 and 73 adjacent to each other in the axial direction. The recess portion 92 is an recessed inward in the radial direction with respect to the outer diameter surfaces of the protrusion portions 72 and 73. A recess portion 93 is formed between the protrusion portions 73 and 74 adjacent to each other in the axial direction. The recess portion 93 is recessed inward in the radial direction with respect to the outer diameter surfaces of the protrusion portions 73 and 74. Similarly, a recess portion 94 is formed between the protrusion portions 74 and 75 adjacent to each other in the axial direction. The recess portion 94 is annularly recessed inward in the radial direction with respect to the outer diameter surfaces of the protrusion portions 74 and 75. A recess portion 95 is formed between the protrusion portions 75 and 76 adjacent to each other in the axial direction. The recess portion 95 is annularly recessed inward in the radial direction with respect to the outer diameter surfaces of the protrusion portions 75 and 76. The recess portions 91 to 95 are also arranged in order from the tip portion 22 side of the piston main body 61 (the upper side in FIG. 2) at intervals in the axial direction of the piston main body 61.

The groove bottom diameter of the recess portion 95 that is at the position farthest from the tip portion 22 in the axial direction of the piston main body 61 (the lower side in FIG. 2), among the recess portions 91 to 95, is smaller than the groove bottom diameters of all the other recess portions 91 to 94. The groove bottom diameters of the recess portions 91 to 94 are the same. The groove bottom surface of the recess portion 91, which is a groove bottom diameter measurement position, has a cylindrical surface shape. Similarly, the groove bottom surface of each of the recess portions 92 to 95 also has a cylindrical surface shape. The protrusion height of the protrusion portion 71 from the groove bottom surfaces of the recess portions 91 to 94 is lower than the protrusion heights of the other protrusion portions 72 to 75 from the groove bottom surfaces of the recess portions 91 to 94.

A small-diameter surface portion 108 having a cylindrical surface shape and configured of the outer peripheral surface of the outer peripheral main body portion 70 is formed on the tip portion 22 side (the upper side in FIG. 2) in the axial direction with respect to the protrusion portion 71 of the piston main body 61. The outer diameter of the small-diameter surface portion 108 is smaller than the outer diameters of all the protrusion portions 71 to 76. The outer diameter of the small-diameter surface portion 108 is smaller than the groove bottom diameters of the recess portions 91 to 94 and is larger than the groove bottom diameter of the recess portion 95. The small-diameter surface portion 108, a large-diameter surface portion 101 which is the outer diameter surface of the protrusion portion 71 adjacent to the small-diameter surface portion 108, and a stepped surface portion 102 between the small-diameter surface portion 108 and the large-diameter surface portion 101 configures a stepped portion 103. Therefore, the piston main body 61 has the stepped portion 103 at one end on the side close to the tip portion 22 in the outer peripheral portion 60 on which the piston band 62 is mounted. The stepped portion 103 is configured of the large-diameter surface portion 101, the stepped surface portion 102, and the small-diameter surface portion 108.

As described above, the piston main body 61 has the plurality of protrusion portions 71 to 76 and recess portions 91 to 95 at the outer peripheral portion 60 on which the piston band 62 is mounted. The protrusion portions 71 to 76 and the recess portions 91 to 95 are provided alternately along the axial direction, such as the protrusion portion 71, the recess portion 91, the protrusion portion 72, the recess portion 92, the protrusion portion 73, the recess portion 93, the protrusion portion 74, the recess portion 94, the protrusion portion 75, the recess portion 95, and the protrusion portion 76. The protrusion portion 71 is formed at one end on the side close to the tip portion 22 of the piston rod 20 (the upper side in FIG. 2). The protrusion portion 76 is formed at the other end on the side far from the tip portion 22 of the piston rod 20 (the lower side in FIG. 2). The small-diameter surface portion 108 is formed on the side close to the tip portion 22 of the protrusion portion 71.

The piston band 62 is made of a low friction material such as fluororesin. Specifically, the piston band 62 is made of PTFE (polytetrafluoroethylene). The piston band 62 has an annular band-shaped band main body portion 110 and a plurality of (specifically, five) inner periphery-side projecting portions 111, 112, 113, 114, and 115 provided at the band main body portion 110, in a state of being mounted on the outer peripheral portion 60 of the piston main body 61. The inner periphery-side projecting portions 111, 112, 113, 114, and 115 are arranged in order from the tip portion 22 side (the upper side in FIG. 2) at intervals in the axial direction of the band main body portion 110. Each of the inner periphery-side projecting portions 111 to 115 has an annular shape that protrudes inward in the radial direction from the band main body portion 110. The inner diameter surface of the inner periphery-side projecting portion 111, which is an inner diameter measurement position, has a cylindrical surface shape. Similarly, the inner diameter surface of each of the inner periphery-side projecting portions 112 to 115 also has a cylindrical surface shape.

An inner periphery-side groove portion 121 is formed between the inner periphery-side projecting portion 111 and the inner periphery-side projecting portion 112 adjacent to each other in the axial direction. The inner periphery-side groove portion 121 is annularly recessed outward in the radial direction with respect to the inner diameter surfaces of the inner periphery-side projecting portion 111 and the inner periphery-side projecting portion 112. Similarly, an inner periphery-side groove portion 122 is formed between the inner periphery-side projecting portion 112 and the inner periphery-side projecting portion 113. The inner periphery-side groove portion 122 is annularly recessed outward in the radial direction with respect to the inner diameter surfaces of the inner periphery-side projecting portion 112 and the inner periphery-side projecting portion 113. An inner periphery-side groove portion 123 is formed between the inner periphery-side projecting portion 113 and the inner periphery-side projecting portion 114. The inner periphery-side groove portion 123 is annularly recessed outward in the radial direction with respect to the inner diameter surfaces of the inner periphery-side projecting portion 113 and the inner periphery-side projecting portion 114. Similarly, an inner periphery-side groove portion 124 is formed between the inner periphery-side projecting portion 114 and the inner periphery-side projecting portion 115. The inner periphery-side groove portion 124 is annularly recessed outward in the radial direction with respect to the inner diameter surfaces of the inner periphery-side projecting portion 114 and the inner periphery-side projecting portion 115. The plurality of inner periphery-side groove portions 121 to 124 are arranged at intervals in the axial direction of the piston band 62. The groove bottom surface of the inner periphery-side groove portion 121, which is a groove bottom diameter measurement position, has a cylindrical surface shape. Similarly, the groove bottom surface of each of the inner periphery-side groove portions 122 to 124 also has a cylindrical surface shape.

In a state where the piston band 62 is mounted on the piston main body 61, the inner periphery-side projecting portion 111 is completely fitted the recess portion 91 without any gap, the inner periphery-side projecting portion 112 is completely fitted to the recess portion 92 without any gap, the inner periphery-side projecting portion 113 is completely fitted to the recess portion 93 without any gap, the inner periphery-side projecting portion 114 is completely fitted to the recess portion 94 without any gap, and the inner periphery-side projecting portion 115 is completely fitted to the recess portion 95 without any gap. Further, the inner periphery-side groove portion 121 is completely fitted to the protrusion portion 72 without any gap, the inner periphery-side groove portion 122 is completely fitted to the protrusion portion 73 without any gap, the inner periphery-side groove portion 123 is completely fitted to the protrusion portion 74 without any gap, and the inner periphery-side groove portion 124 is completely fitted to the protrusion portion 75 without any gap. In FIG. 2, the complete fitting without any gap is shown. However, there may be a portion having a partial gap, that is, a partially separated portion, between each protrusion portion or each recess portion and the piston band 62.

The piston band 62 that is in a state of being mounted on the piston main body 61, as shown in FIG. 2, and in a natural state before being disposed in the cylinder 11 will be further described.

The piston band 62 has a fixed portion 131 and an extended portion 132. The fixed portion 131 is fixed to the piston main body 61 including the inner periphery-side projecting portions 111 to 115 and the inner periphery-side groove portions 121 to 124. The extended portion 132 is an end portion on one end side in the axial direction of the piston band 62. The fixed portion 131 is fitted and fixed to the piston main body 61 in the radial direction and the axial direction. The fixed portion 131 includes portions having axial positions overlapping the inner periphery-side projecting portions 111 to 115 and the inner periphery-side groove portions 121 to 124 of the band main body portion 110. The extended portion 132 is disposed on the side close to the tip portion 22 of the piston band 62 (the upper side in FIG. 2). The extended portion 132 is not fitted and fixed to the piston main body 61 in the axial direction. In other words, the extended portion 132 extends from the end portion on the tip portion 22 side of the fixed portion 131 toward the tip portion 22 side. The extended portion 132 is a portion which does not have an axial positions overlapping the inner periphery-side projecting portions 111 to 115 and the inner periphery-side groove portions 121 to 124 in the band main body portion 110.

The extended portion 132 includes a contact portion 135 and a projecting portion 136. The contact portion 135 comes into contact with the outer diameter surface of the protrusion portion 71 at the end portion on the side closest to the tip portion 22 of the piston main body 61 (the upper side in FIG. 2). The projecting portion 136 protrudes from the contact portion 135 toward the tip portion 22 side in the axial direction. The projecting portion 136 protrudes in a substantially tapered shape such that the diameter becomes smaller toward the tip portion 22, from the contact portion 135 to the tip portion 22 side in the axial direction with respect to the protrusion portion 71 with which the contact portion 135 comes into contact. In other words, the projecting portion 136 has a reduced diameter shape in which the diameter becomes smaller toward the protruding tip side.

An outer peripheral surface 140 facing the outside in the radial direction, of an outer peripheral portion 139 of the piston band 62, has a first outer peripheral surface portion 141, a second outer peripheral surface portion 142, a third outer peripheral surface portion 143, a fourth outer peripheral surface portion 144, a fifth outer peripheral surface portion 145, a sixth outer peripheral surface portion 146, and a seventh outer peripheral surface portion 147 (an outer peripheral surface) in order from the side close to the tip portion 22 of the piston rod 20 (the upper side in FIG. 2). The first outer peripheral surface portion 141 has a diameter that becomes larger as the axial distance from the tip portion 22 increases. The second outer peripheral surface has a cylindrical surface shape or a curved surface shape. The third outer peripheral surface portion 143 has a diameter that becomes smaller as the axial distance from the tip portion 22 increases. The fourth outer peripheral surface portion 144 has a cylindrical surface shape or a curved surface shape. The fifth outer peripheral surface portion 145 has a diameter that becomes larger as the axial distance from the tip portion 22 increases. The sixth outer peripheral surface portion 146 has a cylindrical surface shape or a curved surface shape. The seventh outer peripheral surface portion 147 (the outer peripheral surface) has a diameter that becomes smaller as the axial distance from the tip portion 22 increases. The diameter of the sixth outer peripheral surface portion 146 is smaller than the diameter of the second outer peripheral surface portion 142 and larger than the diameter of the fourth outer peripheral surface portion 144.

Each of the first outer peripheral surface portion 141, the third outer peripheral surface portion 143, and the fifth outer peripheral surface portion 145 has a curved surface shape. The seventh outer peripheral surface portion 147 has a tapered surface shape. The first outer peripheral surface portion 141 is formed on the projecting portion 136. The first outer peripheral surface portion 141 has an axial position overlapping the small-diameter surface portion 108. The second outer peripheral surface portion 142 is formed on the contact portion 135. The second outer peripheral surface portion 142 has an axial position overlapping the protrusion portion 71. The third outer peripheral surface portion 143 is formed on the fixed portion 131. The third outer peripheral surface portion 143 has axial positions overlapping the recess portion 91, the protrusion portion 72, the inner periphery-side projecting portion 111, and the inner periphery-side groove portion 121. The fourth outer peripheral surface portion 144 is formed on the fixed portion 131. The fourth outer peripheral surface portion 144 has axial positions which overlap the protrusion portions 73 and 74, the recess portions 92 and 93, the inner periphery-side groove portions 122 and 123, and the inner periphery-side projecting portions 112 and 113. The fifth outer peripheral surface portion 145 is formed on the fixed portion 131. The fifth outer peripheral surface portion 145 has axial positions overlapping the recess portion 94 and the inner periphery-side projecting portion 114. The sixth outer peripheral surface portion 146 is formed on the fixed portion 131. The sixth outer peripheral surface portion 146 has axial positions overlapping the protrusion portion 75 and the inner periphery-side groove portion 124. The seventh outer peripheral surface portion 147 is formed on the fixed portion 131. The seventh outer peripheral surface portion 147 has axial positions overlapping the recess portion 95 and the inner periphery-side projecting portion 115. The seventh outer peripheral surface portion 147 has the entire axial position overlapping the recess portion 95 and the inner periphery-side projecting portion 115.

Therefore, the fixed portion 131 includes the third outer peripheral surface portion 143, the fourth outer peripheral surface portion 144, the fifth outer periphery surface portion 145, the sixth outer peripheral surface portion 146, and the seventh outer peripheral surface portion 147. The extended portion 132 includes the first outer peripheral surface portion 141 and the second outer peripheral surface portion 142.

In the piston main body 61, the small-diameter surface portion 108, the protrusion portions 71 to 75, and the recess portions 91 to 95 have axial positions overlapping the piston band 62. The outer diameter surface of the protrusion portion 76 does not have an axial position overlapping the piston hand 62.

The first outer peripheral surface portion 141, the second outer peripheral surface portion 142, and the third outer peripheral surface portion 143 configure an outer peripheral surface of an annular first bulging portion 151 having a shape that bulges outward in the radial direction in the piston band 62. The second outer peripheral surface portion 142 forms the position of the maximum diameter in the first bulging portion 151. The portion including the second outer peripheral surface portion 142 of the piston band 62 forms a large diameter portion 152 (a first projecting portion). The first bulging portion 151 and the large diameter portion 152 which is a part thereof configure the outer peripheral surface 140 of the piston band 62. The second outer peripheral surface portion 142 of the large diameter portion 152 has the maximum outer diameter on the outer peripheral surface 140. The first bulging portion 151 is configured of an outer peripheral portion of the extended portion 132 and an outer peripheral portion of the end portion on the extended portion 132 side of the fixed portion 131.

The fifth outer peripheral surface portion 145, the sixth outer peripheral surface portion 146, and the seventh outer peripheral surface portion 147 configure an outer peripheral surface of an annular second bulging portion 155 having a shape that bulges outward in the radial direction in the piston band 62. The sixth outer peripheral surface portion 146 forms the position of the maximum diameter in the second bulging portion 155. The portion including the sixth outer peripheral surface portion 146 of the piston band 62 forms a medium diameter portion 156 (a second projecting portion). The second bulging portion 155 and the medium diameter portion 156 which is a part thereof configure the outer peripheral surface 140 of the piston hand 62. The sixth outer peripheral surface portion 146 of the medium diameter portion 156 has a diameter different from that of the second outer peripheral surface portion 142 of the large diameter portion 152. That is, the sixth outer peripheral surface portion 146 has a smaller diameter than the second outer peripheral surface portion 142. Therefore, the outer diameter of the medium diameter portion 156 is smaller than the outer diameter of the large diameter portion 152. In the piston hand 62, the large diameter portion 152 and the medium diameter portion 156 are provided to be separated from each other in the axial direction. The second bulging portion 155 is configured of an outer peripheral portion of an end portion on the side opposite to the extended portion 132 in the axial direction of the fixed portion 131.

The third outer peripheral surface portion 143, the fourth outer peripheral surface portion 144, and the fifth outer peripheral surface portion 145 configure the outer peripheral surface of an annular concave portion 161 having a shape that is concave inward in the radial direction in the piston band 62. The fourth outer peripheral surface portion 144 forms the position of the minimum diameter of the concave portion 161. The portion that includes the fourth outer peripheral surface portion 144 forms a s diameter portion 162. The concave portion 161 and the small diameter portion 162 which is a part thereof configure the outer peripheral surface 140 of the piston band 62. The fourth outer peripheral surface portion 144 of the small diameter portion 162. has a diameter different from the diameters of the second outer peripheral surface portion 142 of the large diameter portion 152 and the sixth outer peripheral surface portion 146 of the medium diameter portion 156. That is, the fourth outer peripheral surface portion 144 has a smaller diameter than the second outer peripheral surface portion 142 and the sixth outer peripheral surface portion 146. Therefore, the outer diameter of the small diameter portion 162 is smaller than the outer diameters of the large diameter portion 152 and the mediums diameter portion 156. The large diameter portion 152 and the medium diameter portion 156 are provided to protrude outward in the radial direction with respect to the small diameter portion 162. The small diameter portion 162 is provided to be axially separated from the medium diameter portion 156 and the large diameter portion 152. The small diameter portion 162 is configured of an outer peripheral portion at an intermediate position in the axial direction of the fixed portion 131.

The outer peripheral surface of the extended portion 132 is configured of the first outer peripheral surface portion 141 and the second outer peripheral surface portion 142. The inner peripheral surface of the extended portion 132 has a contact surface portion 171 having a cylindrical surface shape, an extended surface portion 172 (an inner peripheral surface), and a tip surface portion 173. The contact surface portion 171 comes into surface contact with the outer diameter surface of the protrusion portion 71. The extended surface portion 172 extends from the contact surface portion 171 to the tip portion 22 side in the axial direction (the upper side in FIG. 2). The tip surface portion 173 connects the end edge portions on the tip portion 22 side in the axial direction, of the extended surface portion 172 and the first outer peripheral surface portion 141. In contrast, the fixed portion 131 has the third outer peripheral surface portion 143, the fourth outer peripheral surface portion 144, the fifth outer peripheral surface portion 145, the sixth outer peripheral surface portion 146, and the seventh outer peripheral surface portion 147.

The boundary between the extended surface portion 172 and the tip surface portion 173 forms an annular inner peripheral surface end 175. The boundary between the first outer peripheral surface portion 141 and the tip surface portion 173 forms an annular outer peripheral surface end 176. Both the inner peripheral surface end 175 and the outer peripheral surface end 176 are separated in the radial direction from the small-diameter surface portion 108. FIG. 2 shows that both the inner peripheral surface end 175 and the outer peripheral surface end 176 are separated in the radial direction from the small-diameter surface portion 108. However, only the inner peripheral surface end 175 may be in contact with the small-diameter surface portion 108. Further, both the inner peripheral surface end 175 and the outer peripheral surface end 176 may be in contact with the small-diameter surface portion 108.

The extended surface portion 172 is inclined so as to approach the small-diameter surface portion 108 from the outer diameter surface of the protrusion portion 71 at a position separated from the protrusion portion 71. In other words, the extended surface portion 172 is inclined such that a diameter decrease toward the side close to the tip portion 22 of the piston rod 20 (the upper side in FIG. 2). The extended surface portion 172 has a tapered shape. Therefore, the extended surface portion 172, which is the inner peripheral surface of the extended portion 132 is inclined from the protrusion portion 71 toward the small-diameter surface portion 108. At one end on the side close to the tip portion 22 of the piston band 62, the extended surface portion 172 is inclined toward the piston main body 61 side from the large-diameter surface portion 104 to the small-diameter surface portion 108 of the stepped portion 103. At one end on the side close to the tip portion 22 of the piston band 62, the extended surface portion 172 is inclined from the large-diameter surface portion 101 toward the small-diameter surface portion 108 of the stepped portion 103. The extended surface portion 172 is separated from the stepped surface 102 of the stepped portion 103.

The tip surface portion 173 is inclined such that a diameter becomes larger toward the side close to the tip portion 22 of the piston rod 20 (the upper side in FIG. 2). The tip surface portion 173 has a tapered shape.

The seventh outer peripheral surface portion 147 is provided at a fitting end portion 181 which is the end portion on the side opposite to the extended portion 132 of the fixed portion 131. The fitting end portion 181 is provided at the other end on the side far from the tip portion 22 (the lower side in FIG. 2), which is opposite to the extended portion 132 provided at one end on the side close to the tip portion 22 in the piston band 62. The seventh outer peripheral surface portion 147, which is the outer peripheral surface of the fitting end portion 181, extends toward the protrusion portion 76. An inner peripheral surface 182 of the fitting end portion 181 is in contact with the recess portion 95 adjacent to the protrusion portion 76. Therefore, at the other end on the side far from the tip portion 22 of the piston band 62, the seventh outer peripheral surface portion 147 is inclined toward the protrusion portion 76, and the inner peripheral surface 182 is in contact with the recess portion 95 adjacent to the protrusion portion 76.

As described above, the outer peripheral portion 139 of the piston band 62 has the first bulging portion 151, the concave portion 161, and the second bulging portion 155 in order from the side close to the tip portion 22 of the piston rod 20 (the upper side in FIG. 2). Further, the piston band 62 has the large diameter portion 152, the medium diameter portion 156, and the small diameter portion 162 at the outer peripheral portion in a natural state before being disposed in the cylinder 11. The large diameter portion 152 is formed on the side close to the tip portion 22 of the piston rod 20. The medium diameter portion 156 is formed on the side far from the tip portion 22 so as to have a smaller diameter than the large diameter portion 152. The small diameter portion 162 is formed between the large diameter portion 152 and the medium diameter portion 156 so as to have a smaller diameter than the medium diameter portion 156. In the natural state, the outer diameter of the large diameter portion 152 is larger than the inner diameter of the inner cylinder 12 of the cylinder 11, and the outer diameter of the medium diameter portion 156 is smaller than the inner diameter of the inner cylinder 12 of the cylinder 11. Therefore, the outer diameter of the small diameter portion 162 is also smaller than the inner diameter of the inner cylinder 12 of the cylinder 11.

In other words, the piston band 62 has the small diameter portion 162, the large diameter portion 152, and the medium diameter portion 156 at the outer peripheral portion 139 in a state before being disposed in the cylinder 11. The large diameter portion 152 is provided to protrude outward in the radial direction from the small diameter portion 162 on the side close to the tip portion 22 of the piston rod 20 with respect to the small diameter portion 162. The medium diameter portion 156 is provided to protrude outward in the radial direction from the small diameter portion 162 on the side far from the tip portion 22 with respect to the small diameter portion 162. The amount of protrusion of the large diameter portion 152 from the small diameter portion 162 is larger than the amount of protrusion of the medium diameter portion 156 from the small diameter portion 162. The piston band 62 made of synthetic resin is formed in the above shape by controlling a temperature at the time of molding, a molding time, or the like.

In a case where the piston band 62 made of synthetic resin is mounted on the piston main body 61 made of metal, a perforated circular plate-shaped band material having a constant thickness, which will become the piston band 62 later, is prepared. This band material has an inner diameter smaller than the outer diameter of the piston main body 61. This band material is deformed into a tapered shape while expanding the inner diameter with a conical jig, and finally deformed into a substantially cylindrical shape to cover the outer peripheral portion 60 of the piston main body 61.

In this state, one end portion in the axial direction of the band material is heated and crimped to form the fitting end portion 181 that is fitted into the recess portion 95. In this way, one end in the axial direction of the band material is fixed to the piston main body 61. The seventh outer peripheral surface portion 147 is formed in a tapered shape by a jig at the time of the crimping. The second bulging portion 155 that includes the seventh outer peripheral surface portion 147, the sixth outer peripheral surface portion 146, and the fifth outer peripheral surface portion 145 is formed mainly due to the thickness portion of the band material fitted to the protrusion portion 75 side by the crimping being raised outward in the radial direction due to the protrusion portion 75.

In a state where one end in the axial direction of the band material is fixed to the piston main body 61 in this way, these are inserted into a cylindrical tunnel of a heating chamber, the cylindrical tunnel having substantially the same inner diameter as the, inner diameter of the inner cylinder 12. In this way, the band material is heated and deformed to form the inner periphery-side projecting portions 111 to 114 that are fitted into the recess portions 91 to 94, so that the portion to become the fixed portion 131 later is generally formed. Then, the outer diameter of the band material is reduced due to the thickness portions to become the inner periphery-side projecting portions 111 to 114 entering the recess portions 91 to 94, so that the portion to become the concave portion 161 later is generally formed.

At this time, the piston main body 61 has the small-diameter surface portion 108 having a shape in which the portion on the side opposite to the protrusion portions 72 to 76 with respect to the protrusion portion 71 extends outward in the axial direction. Therefore, in the band material, the portion to become the extended portion 132 later is not constrained on the side opposite to the fitting end portion 181 in the axial direction, and extends without limitation in the axial direction. At this time, the axial dimension of the protrusion portion 71 is larger than the axial dimensions of the protrusion portions 72 to 75, and the amount of protrusion of the protrusion portion 71 from the groove bottom surfaces of the recess portions 91 to 94 becomes smaller than those of the protrusion portions 72 to 75. Therefore, the portion to become the extended portion 132 later is easily tilted inward in the radial direction following the protrusion portion 71.

Next, by cooling in a water cooling chamber, the band material is cooled to become the piston band 62. Due to this cooling, the band material contracts in a state where the radial inside of the portion that is not fitted to the piston main body 61 in the axial direction and will become the extended portion 132 later is constrained by the protrusion portion 71. As a result, the first bulging portion 151 that includes the first outer peripheral surface portion 141, the second outer peripheral surface portion 142, and the third outer peripheral surface portion 143 is formed, and the extended portion 132 including the contact portion 135 and the projecting portion 136 having a reduced diameter shape is formed.

Figure 3:
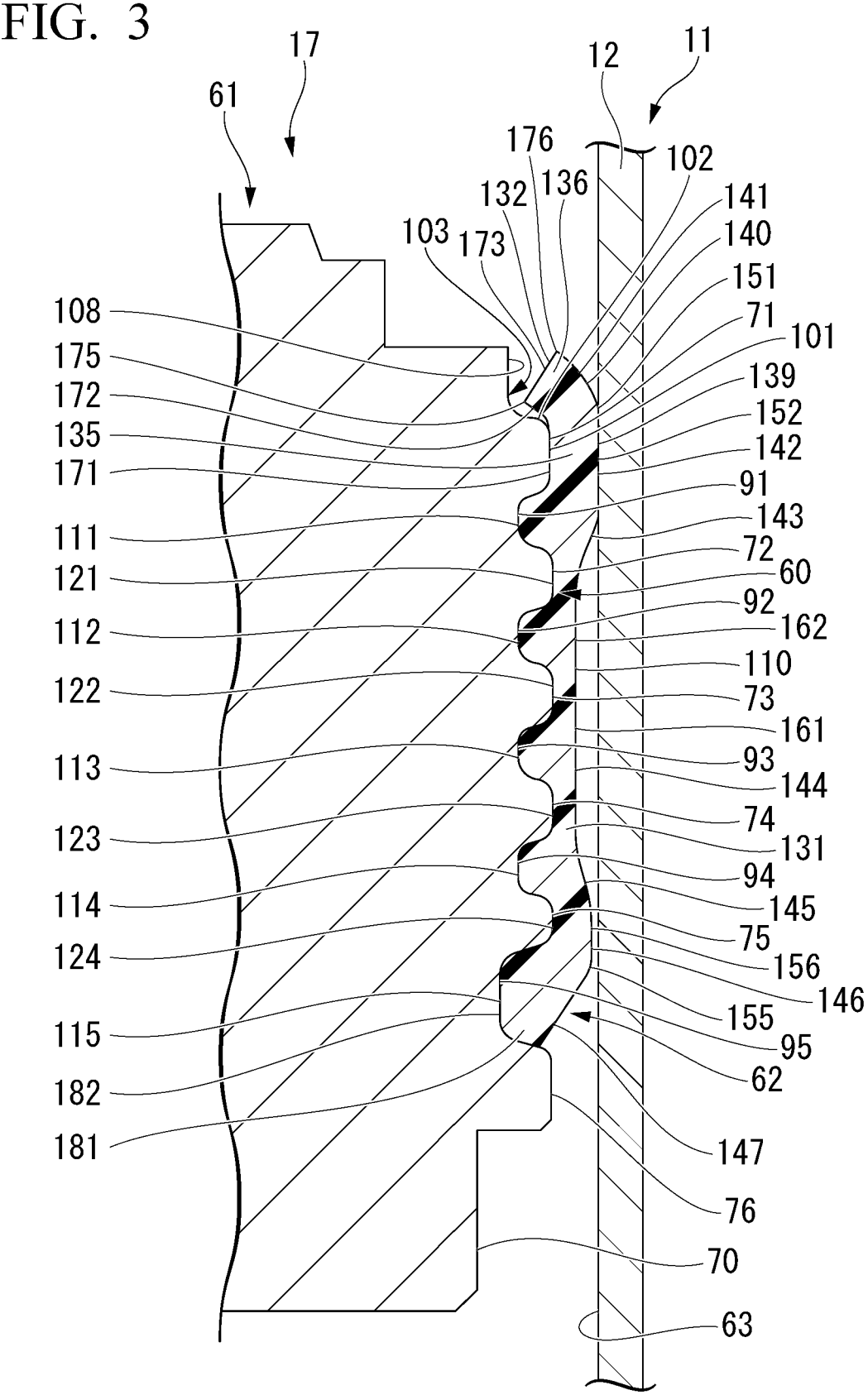
FIG. 3 is a sectional view showing the outer peripheral portion of the piston after being disposed in the cylinder in the shock absorber according to the embodiment of the present invention, and shows a state where it does not receive a radial force.

When the piston 17 including the piston main body 61 and the piston band 62 is fitted into the inner peripheral portion 63 of the inner cylinder 12 made of metal, the extended portion 132 of the piston band 62 is disposed at the end portion on the rod guide 25 side. In this state, since the outer diameter of the large diameter portion 152 is larger than the inner diameter of the inner cylinder 12 of the cylinder 11, the first bulging portion 151 that includes the large diameter portion 152, of the piston band 62, is elastically deformed inward in the radial direction to come into close contact with the cylindrical inner peripheral portion 63 of the inner cylinder 12, as shown in FIG. 3. At this time, since the outer diameter of the medium diameter portion 156 is smaller than the inner diameter of the inner cylinder 12 of the cylinder 11, unless a radial external force, a so-called lateral force, is applied to the piston rod 20, the second bulging portion 155 that includes the medium diameter portion 156, of the piston band 62, does not come into contact with the inner peripheral portion 63 of the inner cylinder 12 and has a radial gap between itself and the inner peripheral portion 63 of the inner cylinder 12. At this time, the small diameter portion 162 also has a radial gap between itself and the inner peripheral portion 63 of the inner cylinder 12. It is preferable that the second bulging portion 155 that includes the medium diameter portion 156, of the piston band 62, does not come into contact with the inner peripheral portion 63 of the inner cylinder 12 and has a radial gap between itself and the inner peripheral portion 63 of the inner cylinder 12. However, slight contact may be made in a state where a lateral force is not applied.

Figure 4:
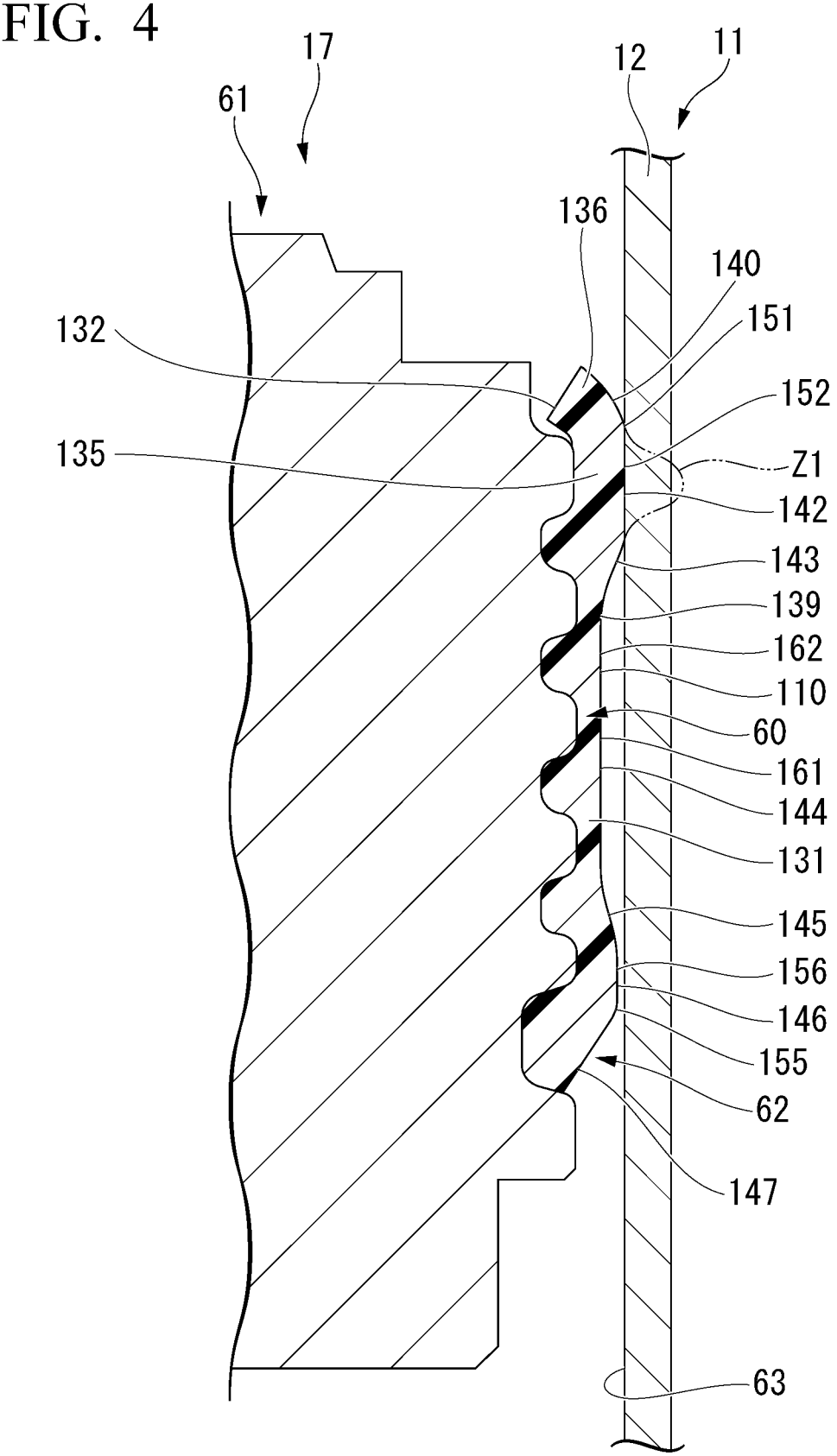
FIG. 4 is a sectional view showing the outer peripheral portion of the piston after being disposed in the cylinder in the shock absorber according to the embodiment of the present invention, and shows a state where the radial force that a piston rod receives is small.

In the shock absorber 10 having the piston 17 disposed in the inner cylinder 12 of the cylinder 11 in this manner, the piston 17 moves with respect to the cylinder 11 together with the piston rod 20. At that time, if the lateral force that the piston rod 20 receives is less than a first predetermined value including 0, even if there is a case where the piston rod 20 is tilted with respect to the cylinder 11 with the rod guide 25 as a fulcrum, the piston 17 moves in the axial direction with only the first bulging portion 151 that includes the large diameter portion 152 coming into contact with the inner peripheral portion 63 of the inner cylinder 12, as shown in FIG. 4. The surface pressure distribution at this time is shown in a two-dot chain line Z1 in FIG. 4.

Figure 5:
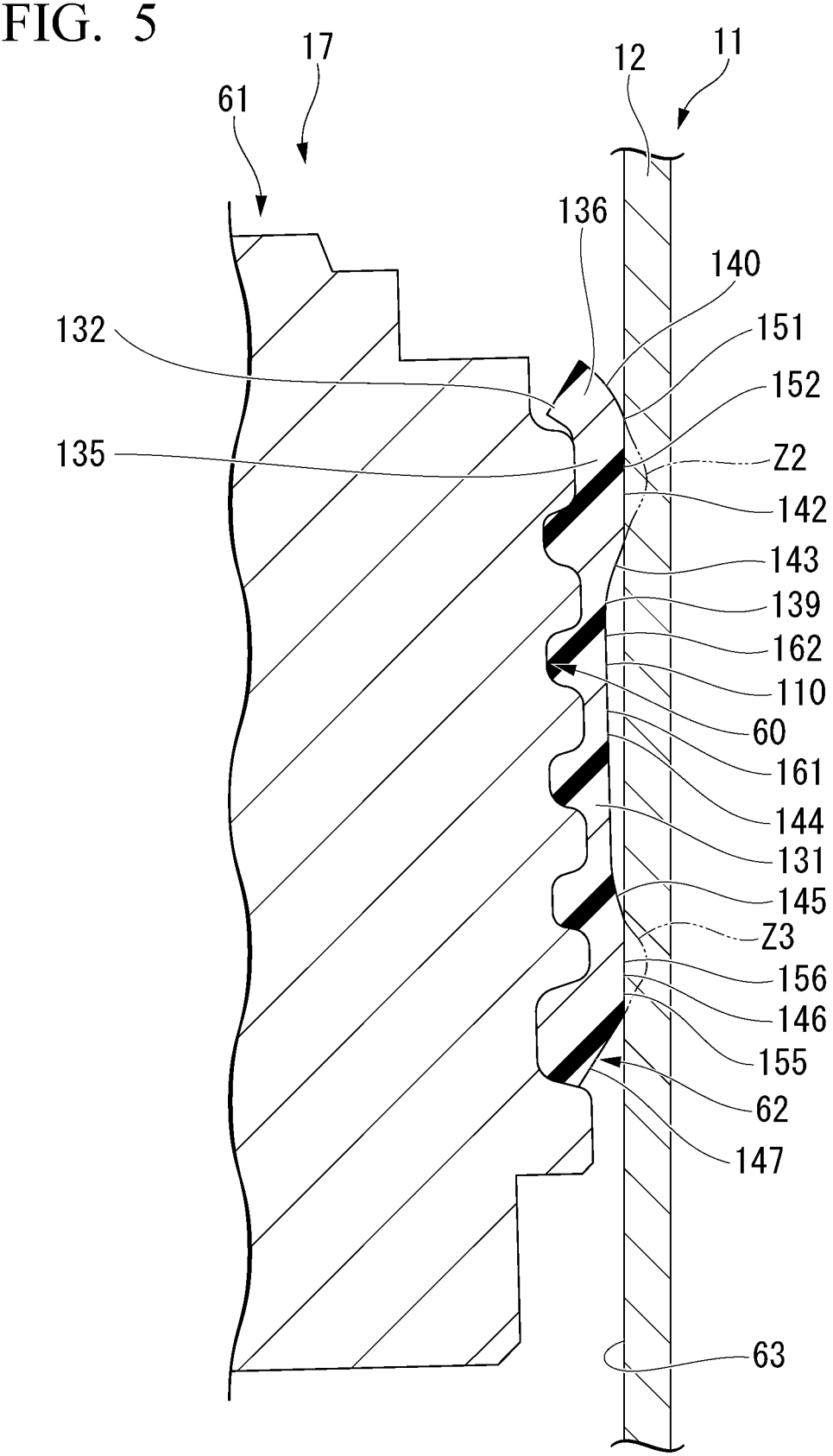
FIG. 5 is a sectional view showing the outer peripheral portion of the piston after being disposed in the cylinder in the shock absorber according to the embodiment of the present invention, shows a state where the radial force that the piston rod receives is large.

Further, if the piston rod 20 receives a lateral force equal to or larger than the first predetermined value and smaller than a second predetermined value, the amount of tilting of the piston rod 20 with respect to the cylinder 11 with the rod guide 25 as a fulcrum becomes larger than the above. In this way, the piston 17 moves in the axial direction with the first bulging portion 151 that includes the large diameter portion 152 and the second bulging portion 155 that includes the medium diameter portion 156 coming into contact with the inner peripheral portion 63 of the inner cylinder 12, as shown in FIG. 5. At this time, the small diameter portion 162 of the concave portion 161 does not come into contact with the inner peripheral portion 63 of the inner cylinder 12. The contact area of the piston band 62 with the inner peripheral portion 63 at this time becomes larger than that in the above state where the contact is made only at the first bulging portion 151. Therefore, the surface pressure that the piston band 62 receives becomes low. The surface pressure distributions at this time are as shown in two-dot chain lines Z2 and Z3 in FIG. 5, and the surface pressure becomes lower than that in the case shown in the two-dot chain line Z1 in FIG. 4. The contact area between the piston band 62 and the inner peripheral portion 63 of the cylinder 11 becomes larger when a radial force acts on the piston rod 20 than when the radial force does not act on the piston rod 20.

Figure 6:
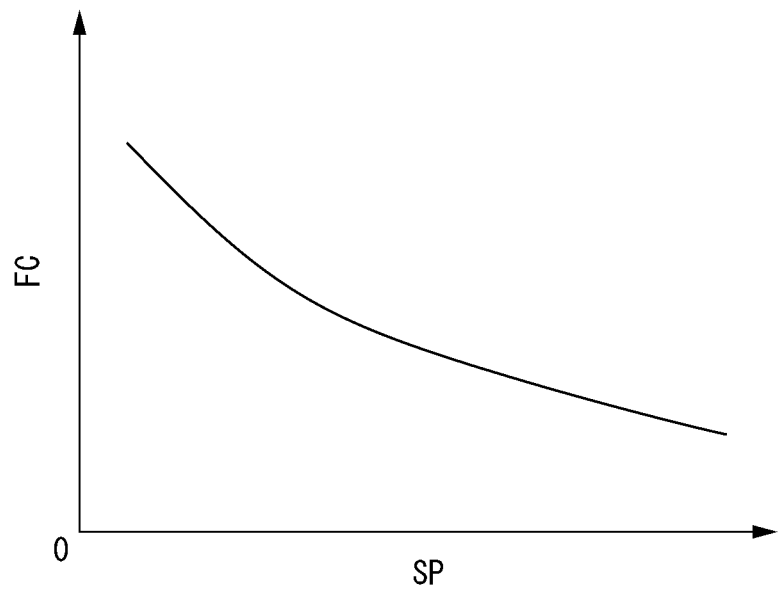
FIG. 6 is a characteristic diagram showing the relationship of a friction coefficient (FC) of PTFE (polytetrafluoroethylene) with respect to a surface pressure (SP).

Here, PTFE is a material having a surface pressure dependence in which when the surface pressure (SP) is high, the friction coefficient (FC) is low, and when the surface pressure (SP) is low, the friction coefficient (EC) is high, as shown in FIG. 6. Since the piston band 62 made of PTFE has a high friction coefficient when the surface pressure is low in this way, as shown by a solid line X1 in FIG. 7, the frictional force (FF) that is generated on the contact surface between the piston 17 and the cylinder 11 becomes larger in a case where the first bulging portion 151 and the second bulging portion 155 come into contact with the inner peripheral portion 63 of the inner cylinder 12, so that the lateral force (LF) is large and the surface pressure is low, than in a case where only the first bulging portion 151 comes into contact with the inner peripheral portion 63 of the inner cylinder 12, so that the lateral force (LF) is small and the surface pressure is high.

Further, if the piston rod 20 receives the lateral force (LF) equal to or larger than the second predetermined value, the amount of tilting of the piston rod 20 with respect to the cylinder 11 with the rod guide 25 as a fulcrum becomes even larger than the above. Then, the piston 17 moves in the axial direction with the first bulging portion 151, the second bulging portion 155, and the concave portion 161 coining into contact with the inner peripheral portion 63 of the inner cylinder 12. The contact area of the piston band 62 with the inner peripheral portion 63 at this time becomes larger than that in the above state where the contact is made only at the first bulging portion 151 and the second bulging portion 155, and the surface pressure (SP) becomes lower. Since the friction coefficient (FC) of the piston band 62 becomes high when the surface pressure (SP) is low, the frictional force that is generated on the contact surface between the piston 17 and the cylinder 11 becomes even larger, as shown by the solid line X1 in FIG. 7, than in a case where the contact with the inner peripheral portion 63 of the inner cylinder 12 is made only at the first bulging portion 151 and the second bulging portion 155.

Figure 7:
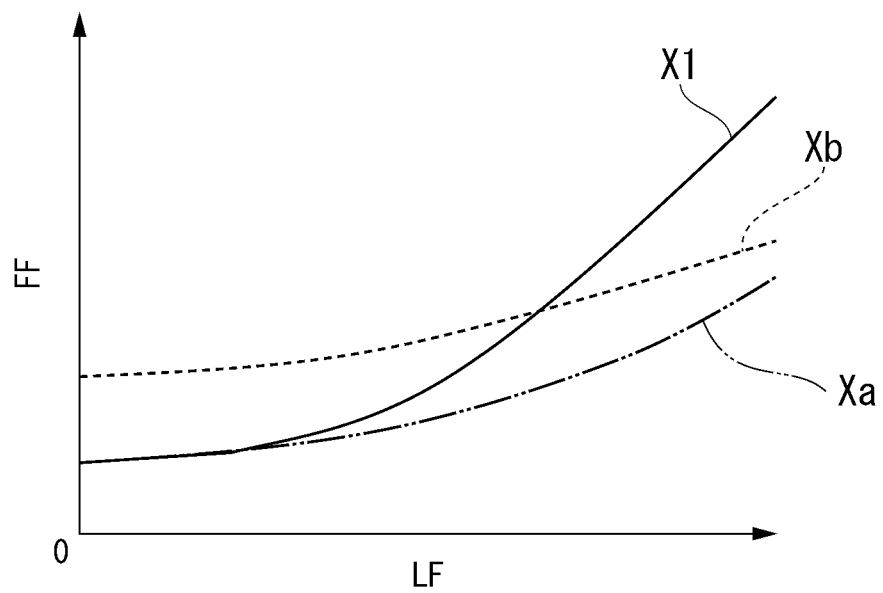
FIG. 7 is a characteristic diagram showing the relationship of a frictional force (FF) that is generated between the piston and the cylinder with respect to the radial force (a lateral force (LF)) that is applied to the piston rod of the shock absorber according to the embodiment of the present invention.
Figure 8A:
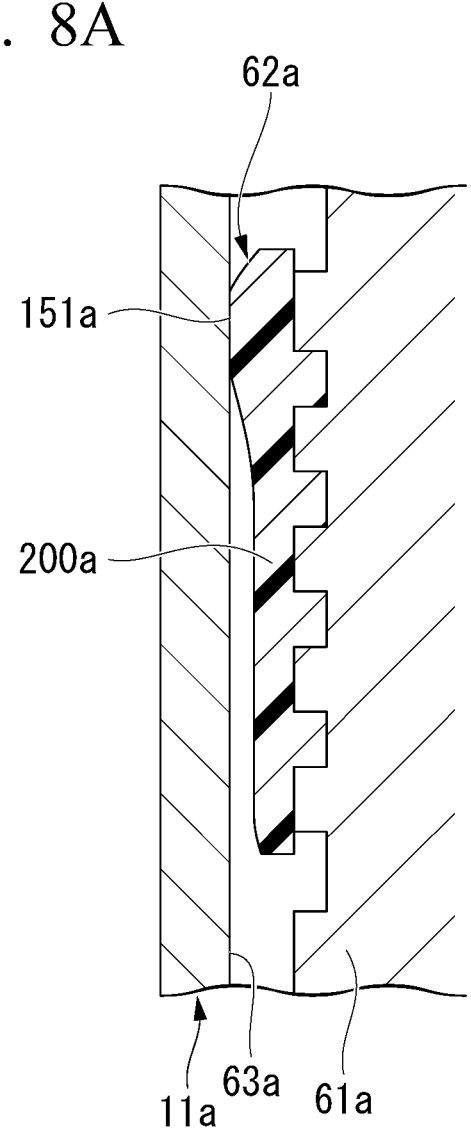
FIG. 8A is a sectional view in a state where a piston of a shock absorber is disposed in a cylinder, showing Comparative Example 1.

Patent Document 1 described above discloses a structure in which a piston band 62a that is mounted on an outer peripheral portion of a piston main body 61a has an annular protrusion portion 151a, which bulges outward in the radial direction with respect to a main body portion 200a, only on one end side of the piston band 62a (the rod guide (not shown) side), as shown in FIG. 8A. When such a structure is defined as Comparative Example 1, in Comparative Example 1, in a state where the lateral force that the piston rod receives is small including 0, the annular protrusion portion 151a on one side of the piston band 62a comes into sliding contact with the inner peripheral portion 63a of a cylinder 11a with a high surface pressure, and therefore, the frictional force that is generated by the piston band 62a can be suppressed to a small value, as shown by a two-dot chain line Xa in FIG. 7. If the lateral force increases from this state and becomes relatively large, the frictional force that is generated by the piston band 62a increases due to the sliding contact with the inner peripheral portion of the cylinder 11a being made even at the other end portion of the piston band 62a in addition to the annular protrusion portion 151a. At this time, unless the lateral force becomes relatively large, the other end portion of the piston band 62a does not come into sliding contact with the inner peripheral portion 63a of the cylinder 11a, and therefore, the ratio of an increase in the frictional force of the piston band 62a to an increase in the lateral force is low.

Further, Patent Document 1 discloses a structure in which a piston band 62b that is mounted on an outer peripheral portion of a piston main body 61b has annular protrusion portions 151b, which bulge outward in the radial direction from a main body portion 200b and have the same outer diameter, at both end portions of the piston band 62b, as shown in FIG. 8B. When such a structure is defined as Comparative Example 2, in Comparative Example 2, as shown in FIG. 8B, even in a state where the lateral force that the piston rod receives is small including 0, the annular protrusion portions 151b on both sides of the piston band 62b come into sliding contact with an inner peripheral portion 63b of a cylinder 11b. Therefore, as shown by a broken line Xb in FIG. 7, even in a state where the lateral force is small including 0, the surface pressure is low and the frictional force that is generated by the piston band 62b becomes large. If the lateral force increases from this state, although the frictional force that is generated by the piston band 62b becomes larger, the ratio of an increase of the frictional force is low because the annular protrusion portions 151b on both sides are in sliding contact with the inner peripheral portion 63b of the cylinder 11b from the beginning.

In contrast, in the present embodiment, the piston band 62 has the large diameter portion 152, the medium diameter portion 156, and the small diameter portion 162 at the outer peripheral portion thereof in a natural state before being disposed in the cylinder 11. The large diameter portion 152 is formed on the side close to the tip portion 22 of the piston rod 20. The medium diameter portion 156 is formed on the side far from the tip portion 22 so as to have a smaller diameter than the large diameter portion 152. The small diameter portion 162 is formed between the large diameter portion 152 and the medium diameter portion 156 so as to have a smaller diameter than the medium diameter portion 156. In other words, the piston band 62 has the small diameter portion 162, the large diameter portion 152, and the medium diameter portion 156 at the outer peripheral portion thereof in a natural state before being disposed in the cylinder 11. The large diameter portion 152 is provided to protrude outward in the radial direction from the small diameter portion 162 on the side close to the tip portion 22 of the piston rod 20 with respect to the small diameter portion 162. The medium diameter portion 156 is provided to protrude outward in the radial direction from the small diameter portion 162 on the side far from the tip portion 22 with respect to the small diameter portion 162. The amount of protrusion of the large diameter portion 152 in the radial direction from the small diameter portion 162 is larger than the amount of protrusion of the medium diameter portion 156 in the radial direction from the small diameter portion 162.

Therefore, in a state where the lateral force that the piston rod 20 receives is small including 0, the first bulging portion 151 that includes the large diameter portion 152 comes into contact with the inner peripheral portion 63 of the inner cylinder 12. If the lateral force becomes larger than this, the first bulging portion 151 that includes the large diameter portion 152 and the second bulging portion 155 that includes the medium diameter portion 156 is capable of coming into contact with the inner peripheral portion 63 of the inner cylinder 12. Further, if the lateral force becomes larger than this, it becomes possible to increase the contact area with the inner peripheral portion 63 of the inner cylinder 12 of the concave portion 161 in addition to the first bulging portion 151 that includes the large diameter portion 152 and the second bulging portion 155 that includes the medium diameter portion 156.

Therefore, as shown by the solid line X1 in FIG. 7, it becomes possible to obtain a frictional characteristic in which the frictional force (FF) that is generated by the piston band 62 is reduced when the lateral force (LF) is small, the frictional force (FF) that is generated by the piston band 62 is increased when the lateral force (LF) is large, and the ratio of the increase at that time is high. Therefore, the axial force of the piston rod 20 when the lateral force (LF) is small is suppressed to a small value, and when the lateral force (LF) is large, the axial force of the piston rod 20 can be increased.

In a state where the piston rod 20 does not receive a radial force, the medium diameter portion 156 of the piston band 62 has a radial gap between itself and the inner peripheral portion 63 of the cylinder 11. Therefore, a frictional characteristic becomes more remarkable in which the frictional force that is generated by the piston band 62 is reduced when the lateral force is small, the frictional force that is generated by the piston band 62 is increased when the lateral force is large, and the ratio of the increase at that time is high. When the frictional force between the medium diameter portion 156 and the cylinder 11 in a state where the piston rod 20 does not receive a radial force is small, the medium diameter portion 156 may be in contact with the inner peripheral portion 63 of the cylinder 11 without a radial gap therebetween.

The extended surface portion 172, which is the inner peripheral surface at one end of the piston hand 62, is inclined from the protrusion portion 71 toward the small-diameter surface portion 108. The seventh outer peripheral surface portion 147, which is the outer peripheral surface at the other end of the piston band 62, is inclined toward the protrusion portion 76. The inner peripheral surface 182 at the other end of the piston band 62 is in contact with the recess portion 95 adjacent to the protrusion portion 76. In this way, in a step of mounting the piston band 62 on the piston 60, the position of the piston band 62 with respect to the piston 60 can be restricted by the fitting end portion 181. Further, the deformation of the piston hand 62 can be restricted at the fitting end portion 181 in the axial direction, and the side opposite to the fitting end portion 181 in the axial direction is not constrained and is capable of extending in the axial direction without limitation.

In the projecting portion 136 at one end of the piston band 62, both the inner peripheral surface end 175 and the outer peripheral surface end 176 are separated from the small-diameter surface portion 108. In this way, the projecting portion 136 at one end of the piston band 62 is not constrained by the small-diameter surface portion 108, and therefore, the projecting portion 136 can be easily deformed into a reduced diameter shape having a smaller diameter toward the protruding tip side.

The protrusion height of the protrusion portion 71 of the piston main body, which comes into contact with the extended portion 132 of the piston hand 62, is lower than the protrusion heights of the other protrusion portions 72 to 76. In this way, it is possible to promote the deformation of the extended portion 132 of the piston band 62 into a reduced diameter shape of the projecting portion 136.

The protrusion portion 71 of the piston main body 61, which comes into contact with the extended portion 132 of the piston band 62, has an axial dimension larger than the axial dimensions of all the protrusion portions 72 to 75 in which the piston band 62 comes into contact with the outer diameter surfaces thereof. In this way, the amount of radial bulging of the first bulging portion 151 that is formed when the piston band 62 is cooled can be increased. In other words, the large diameter portion 152 can be easily made larger than the medium diameter portion 156.

The piston band 62 is formed of a material that is a low friction material and has a characteristic in which the friction coefficient increases when the surface pressure is low. Therefore, the piston band 62 has a frictional characteristic in which when the lateral force is small, the contact area with the cylinder 11 is small, and the surface pressure is high, the frictional force becomes small, and when the lateral force is large, the contact area with the cylinder 11 is large, and the surface pressure is low, the frictional force becomes large.

The piston band 62 has the medium diameter portion 156 having a radial gap between itself and the inner peripheral portion 63 of the cylinder 11 in a state where the piston rod 20 does not receive a radial force. Therefore, the contact area between the piston hand 62 and the inner peripheral portion 63 of the cylinder 11 becomes larger when a radial force acts on the piston rod 20 than when a radial force does not act on the piston rod 20. Therefore, a frictional characteristic become more remarkable in which when the lateral force is small, the contact area with the cylinder 11 is small, and the surface pressure is high, the frictional force becomes small, when the lateral force is large, the contact area with the cylinder 11 is large, the frictional force becomes large, and the surface pressure is low, and the ratio of the increase in frictional force is high.

Here, a frictional force characteristic that is generated by the shock absorber is important for creating a stable posture of a vehicle when the vehicle turns. In particular, the axial force of the shock absorber in a low piston speed region is important. In this region, the contribution of the frictional force that is generated between the piston band and the cylinder is high. If the frictional force that is generated between the piston band and the cylinder is small, although the riding comfort performance can be improved, the vehicle tends to be unstable when the vehicle turns.

In contrast, when the shock absorber 10 of the present embodiment is used for a suspension device of a vehicle, as described above, the frictional force that is generated by the piston band 62 can be reduced during normal traveling when the lateral force is small, and therefore, good riding comfort can be obtained. That is, in a situation where the lateral force that is applied to the shock absorber 10 is small, such as traveling in a straight line or the like, by bringing only the first bulging portion 151 on the rod guide 25 side of the piston band 62 into contact with the cylinder 11, it is possible to reduce the frictional force of the shock absorber 10, and therefore, it becomes possible to improve the riding comfort performance.

Further, when the vehicle turns with a large lateral force, since it is possible to increase the frictional force that is generated by the piston band 62, the posture of the vehicle is stabilized. That is, in a situation where the lateral force that is applied to the shock absorber 10 is large, such as turning or the like, it is possible to increase the frictional force of the shock absorber 10 by bringing the second bulging portion 155 on the bottom portion 15 side of the cylinder 11 into contact with the cylinder 11, in addition to the first bulging portion 154 on the rod guide 25 side of the piston band 62. When the lateral force is further increased, it is possible to further increase the frictional force of the shock absorber 10 by bringing the concave portion 161 between the first bulging portion 151 and the second bulging portion 155 into contact with the cylinder 11, so that it becomes possible to improve steering stability. Therefore, it is possible to achieve both improvement in riding comfort performance and improvement in steering stability.

In the embodiment described above, a configuration is made in which each of the large diameter portion 152, the medium diameter portion 156, and the small diameter portion 162 is formed in an annular shape with a constant diameter over the entire periphery of the outer peripheral surface 140 of the piston band 62. However, at least one of the large diameter portion 152 and the medium diameter portion 156 protruding in the radial direction from the small diameter portion 162 may be partially formed in the circumferential direction. Further, portions having different diameters may be partially formed in three or more steps in the circumferential direction. In either case, the contact area between the piston band 62 and the inner peripheral portion 63 of the cylinder 11 becomes larger when a radial force acts on the piston rod 20 than when a radial force does not act on the piston rod 20.

Further, in the embodiment described above, the plurality of protrusion portions 71 to 76 and recess portions 91 to 95 are provided on the outer periphery of the piston main body 61. The protrusion portions 71 to 76 and the recess portions 91 to 95 are provided alternately along the axial direction, such as the protrusion portion 71, the recess portion 91, the protrusion portion 72, the recess portion 92, the protrusion portion 73, the recess portion 93, the protrusion portion 74, the recess portion 94, the protrusion portion 75, the recess portion 95, and the protrusion portion 76. The protrusion portion 71 is formed at one end on the side close to the tip portion 22 of the piston rod 20 (the upper side in FIG. 2). The protrusion portion 76 is formed at the other end on the side far from the tip portion 22 of the piston rod 20 (the lower side in FIG. 2). The small-diameter surface portion 108 is formed on the side close to the tip portion 22, of the protrusion portion 71. However, one protrusion portion or only one recess portion may be formed on the outer periphery of the piston body 61.

Further, the shapes of the other ends of the piston main body 61 and the piston band 62 are not limited to the shapes in the embodiment described above, and the inner peripheral surface 182 may not be in contact with the recess portion 95 adjacent to the protrusion portion 76.

According to the first aspect of the present invention described above, the shock absorber includes: a bottomed cylinder-shaped cylinder in which a working fluid is enclosed; a piston rod having a base end portion that is inserted into the cylinder, and a tip portion that protrudes out of the cylinder; a piston that is fixed to the base end portion side of the piston rod and defines an inside of the cylinder into a one-side chamber and an other-side chamber; and a rod guide provided on a side opposite to a bottom portion of the cylinder to guide the piston rod. The piston includes a piston main body that is fixed to the piston rod, and a piston band that is provided on an outer peripheral portion of the piston body and is in sliding contact with an inner peripheral portion of the cylinder. The piston main body has a stepped portion including a large-diameter surface portion, a stepped surface portion, and a small-diameter surface portion, at one end on the side close to the tip portion of the piston rod, of the outer peripheral portion on which the piston hand is mounted. The piston band has, at an outer peripheral portion thereof, a large diameter portion that is formed on the side close to the tip portion of the piston rod, a medium diameter portion that is formed on the side far from the tip portion so as to have a smaller diameter than the large diameter portion, and a small diameter portion that is formed between the large diameter portion and the medium diameter portion so as to have a smaller diameter than the medium diameter portion, in a state before being disposed in the cylinder. At the one end on the side close to the tip portion of the piston rod, an inner peripheral surface is inclined toward the piston main body side from the large-diameter surface portion to the small-diameter surface portion of the stepped portion. In this way, it becomes possible to increase the ratio of an increase in the frictional force between the piston and the cylinder to an increase in the radial force that is applied to the piston rod.

According to a second aspect, in the first aspect, an inner peripheral surface at one end of the piston band is separated from a stepped surface of the stepped portion.

According to a third aspect, in the first or second aspect, at one end of the piston band, both an inner peripheral surface end and an outer peripheral surface end are separated from the small-diameter surface portion.

According to a fourth aspect, in any one of the first to third aspects, the piston main body includes a protrusion portion and a recess portion provided along the axial direction at the outer peripheral portion on which the piston band is mounted, a first protrusion portion is formed at one end on the side dose to the tip portion of the piston rod, and the small-diameter surface portion is formed on the side dose to the tip portion of the piston rod, of the first protrusion portion, and at one end of the piston band, an inner peripheral surface is inclined from the first protrusion portion toward the small-diameter surface portion.

According to a fifth aspect, in the fourth aspect, a second protrusion portion is formed at the other end on the side far from the tip portion, and at the other end of the piston hand, an outer peripheral surface is inclined toward the second protrusion portion, and an inner peripheral surface is in contact with the recess portion adjacent to the second protrusion portion.

According to a sixth aspect, in the fourth or fifth aspect, the first protrusion portion has a protrusion height lower than protrusion heights of other protrusion portions.

According to a seventh aspect, in any one of the fourth to sixth aspects, the first protrusion portion has an axial dimension larger than axial dimensions of other protrusion portions.

According to an eighth aspect, in any one of the first to seventh aspects, the piston band is formed of a material that is a low friction material and has a characteristic in which a friction coefficient increases when a surface pressure is low.

According to a ninth aspect, the shock absorber includes: a bottomed cylinder-shaped cylinder in which a working fluid is enclosed; a piston rod having a base end portion that is inserted into the cylinder, and a tip portion that protrudes out of the cylinder; a piston that is fixed to a base end portion side of the piston rod and defines an inside of the cylinder into a one-side chamber and an other-side chamber; and a rod guide provided on a side opposite to a bottom portion of the cylinder to guide the piston rod. The piston includes a piston main body that is fixed to the piston rod, and a piston band that is provided on an outer peripheral portion of the piston main body and is in sliding contact with an inner peripheral portion of the cylinder. The piston main body has a stepped portion including a large-diameter surface portion, a stepped surface portion, and a small-diameter surface portion, at one end on the side close to a tip portion of the piston rod, of an outer peripheral portion on which the piston hand is mounted. The piston band has, at an outer peripheral portion thereof, a small diameter portion, a first projecting portion that is provided to protrude from the small diameter portion on the side close to the tip portion of the piston rod with respect to the small diameter portion, and a second projecting portion that is provided to protrude from the small diameter portion on the side far from the tip portion with respect to the small diameter portion, and is smaller than the first projecting portion, in a state before being disposed in the cylinder. At one end of the piston band on the side close to the tip portion of the piston rod, an inner peripheral surface is inclined from the large-diameter surface portion toward the small-diameter surface portion. In this way, it becomes possible to increase the ratio of an increase in frictional force between the piston and the cylinder to an increase in the radial force that is applied to the piston rod.

According to a tenth aspect, in the ninth aspect, the piston main body includes a protrusion portion and a recess portion provided along the axial direction at the outer peripheral portion on which the piston band is mounted, and a first protrusion portion is formed at one end on the side close to the tip portion of the piston rod, and at one end of the piston band, the inner peripheral surface is inclined from the first protrusion portion toward the small-diameter surface portion.

According to an eleventh aspect, in the tenth aspect, a second protrusion portion is formed at the other end on the side far from the tip portion, the small-diameter surface portion is formed on the side close to the tip portion of the piston rod, of the first protrusion portion, and at the other end of the piston band, an outer peripheral surface is inclined toward the second protrusion portion, and an inner peripheral surface is in contact with the recess portion adjacent to the second protrusion portion.

According to a twelfth aspect, in any one of the first to eleventh aspects, a contact area between the piston band and the inner peripheral portion of the cylinder becomes larger when a radial force acts on the piston rod than when a radial force does not act on the piston rod.

INDUSTRIAL APPLICABILITY

According to the shock absorber described above, it is possible to increase the ratio of are increase in the frictional force between the piston and the cylinder to an increase in the radial force that is applied to the piston rod.

REFERENCE SIGNS LIST

10: Shock absorber
11: Cylinder
15: Bottom portion
17: Piston
18: One-side chamber
19: Other-side chamber
20: Piston rod
21: Base end portion
22: Tip portion
25: Rod guide
60: Outer peripheral portion
61: Piston main body
62: Piston band
63: Inner peripheral portion
71: Protrusion portion (first protrusion portion)
72 to 75: Protrusion portion
76: Protrusion portion (second protrusion portion)
91 to 95: Recess portion
101: Large-diameter surface portion
102: Stepped surface portion
103: Stepped portion
108: Small-diameter surface portion
139: Outer peripheral portion
147: Seventh outer peripheral surface portion (outer peripheral surface)
152: Large diameter portion (first projecting portion)
156: Medium diameter portion (second projecting portion)
162: Small diameter portion
172: Extended surface portion (inner peripheral surface)
175: Inner peripheral surface end
176: Outer peripheral surface end
187: inner peripheral surface

The invention claimed is:

1. A shock absorber comprising:
a bottomed cylinder-shaped cylinder in which a working fluid is enclosed;
a piston rod having a base end portion that is inserted into the cylinder, and a tip portion that protrudes out of the cylinder;
a piston that is fixed to a base end portion side of the piston rod and defines an inside of the cylinder into a one-side chamber and an other-side chamber; and a rod guide provided on a side opposite to a bottom portion of the cylinder to guide the piston rod, wherein the piston includes:

a piston main body that is fixed to the piston rod; and a piston band that is provided on an outer peripheral portion of the piston main body and is in sliding contact with an inner peripheral portion of the cylinder, wherein the piston main body has a stepped portion including a large-diameter surface portion, a stepped surface portion, and a small-diameter surface portion, at one end on a side close to the tip portion of the piston rod, of the outer peripheral portion on which the piston band is mounted, wherein the piston band has, at an outer peripheral portion thereof, a large diameter portion that is formed on the side close to the tip portion of the piston rod, a medium diameter portion that is formed on a side far from the tip portion so as to have a smaller diameter than the large diameter portion, and a small diameter portion that is formed between the large diameter portion and the medium diameter portion so as to have a smaller diameter than the medium diameter portion, in a state before being disposed in the cylinder, wherein, at the one end on the side close to the tip portion of the piston rod, an inner peripheral surface is inclined toward a piston main body side from the large-diameter surface portion to the small-diameter surface portion of the stepped portion, wherein the inner peripheral surface at the one end of the piston band is separated from a stepped surface of the stepped portion, and wherein at the one end of the piston band, both an inner peripheral surface end and an outer peripheral surface end are separated from the small-diameter surface portion.

2. The shock absorber according to claim 1, wherein the piston main body includes a protrusion portion and a recess portion provided along an axial direction at the outer peripheral portion on which the piston band is mounted, a first protrusion portion is formed at the one end on the side close to the tip portion of the piston rod, and the small-diameter surface portion is formed on the side close to the tip portion of the piston rod, of the first protrusion portion, and at the one end of the piston band, the inner peripheral surface is inclined from the first protrusion portion toward the small-diameter surface portion.

3. The shock absorber according to claim 2, wherein a second protrusion portion is formed at the other end on the side far from the tip portion, and at the other end of the piston band, an outer peripheral surface is inclined toward the second protrusion portion, and the inner peripheral surface is in contact with the recess portion adjacent to the second protrusion portion.

4. The shock absorber according to claim 2, wherein the first protrusion portion has a protrusion height lower than protrusion heights of other protrusion portions.

5. The shock absorber according to claim 2, wherein the first protrusion portion has an axial dimension larger than axial dimensions of other protrusion portions.

6. The shock absorber according to claim 1, wherein the piston band is formed of a material that is a low friction material and has a characteristic in which a friction coefficient increases when a surface pressure is low.

7. The shock absorber according to claim 6, wherein a contact area between the piston band and the inner peripheral portion of the cylinder becomes larger when a radial force acts on the piston rod than when a radial force does not act on the piston rod.

8. The shock absorber according to claim 1, wherein a contact area between the piston band and the inner peripheral portion of the cylinder becomes larger when a radial force acts on the piston rod than when a radial force does not act on the piston rod.

9. A shock absorber comprising:

a bottomed cylinder-shaped cylinder in which a working fluid is enclosed;

a piston rod having a base end portion that is inserted into the cylinder, and a tip portion that protrudes out of the cylinder;

a piston that is fixed to a base end portion side of the piston rod and defines an inside of the cylinder into a one-side chamber and an other-side chamber; and a rod guide provided on a side opposite to a bottom portion of the cylinder to guide the piston rod, wherein the piston includes:

a piston main body that is fixed to the piston rod; and a piston band that is provided on an outer peripheral portion of the piston main body and is in sliding contact with an inner peripheral portion of the cylinder, wherein the piston main body has a stepped portion including a large-diameter surface portion, a stepped surface portion, and a small-diameter surface portion, at one end on a side close to a tip portion of the piston rod, of an outer peripheral portion on which the piston band is mounted, wherein the piston band has, at an outer peripheral portion thereof, a small diameter portion;

a first projecting portion that is provided to protrude from the small diameter portion on the side close to the tip portion of the piston rod with respect to the small diameter portion; and a second projecting portion that is provided to protrude from the small diameter portion on a side far from the tip portion with respect to the small diameter portion and is smaller than the first projecting portion, in a state before being disposed in the cylinder, wherein, at one end of the piston band on the side close to the tip portion of the piston rod, an inner peripheral surface is inclined from the large-diameter surface portion toward the small-diameter surface portion, wherein the inner peripheral surface at the one end of the piston band is separated from a stepped surface of the stepped portion, and wherein at the one end of the piston band, both an inner peripheral surface end and an outer peripheral surface end are separated from the small-diameter surface portion.

10. The shock absorber according to claim 9, wherein the piston main body includes a protrusion portion and a recess portion provided along an axial direction at the outer peripheral portion on which the piston band is mounted, and a first protrusion portion is formed at one end on the side close to the tip portion of the piston rod, and at one end of the piston band, the inner peripheral surface is inclined from the first protrusion portion toward the small-diameter surface portion.

11. The shock absorber according to claim 10, wherein a second protrusion portion is formed at the other end on the side far from the tip portion, the small-diameter surface portion is formed on the side close to the tip portion of the piston rod, of the first protrusion portion, and at the other end of the piston band, an outer peripheral surface is inclined toward the second protrusion portion, and the inner peripheral surface is in contact with the recess portion adjacent to the second protrusion portion.

* * * * *